United States Patent Office 3,421,542
Patented Jan. 14, 1969

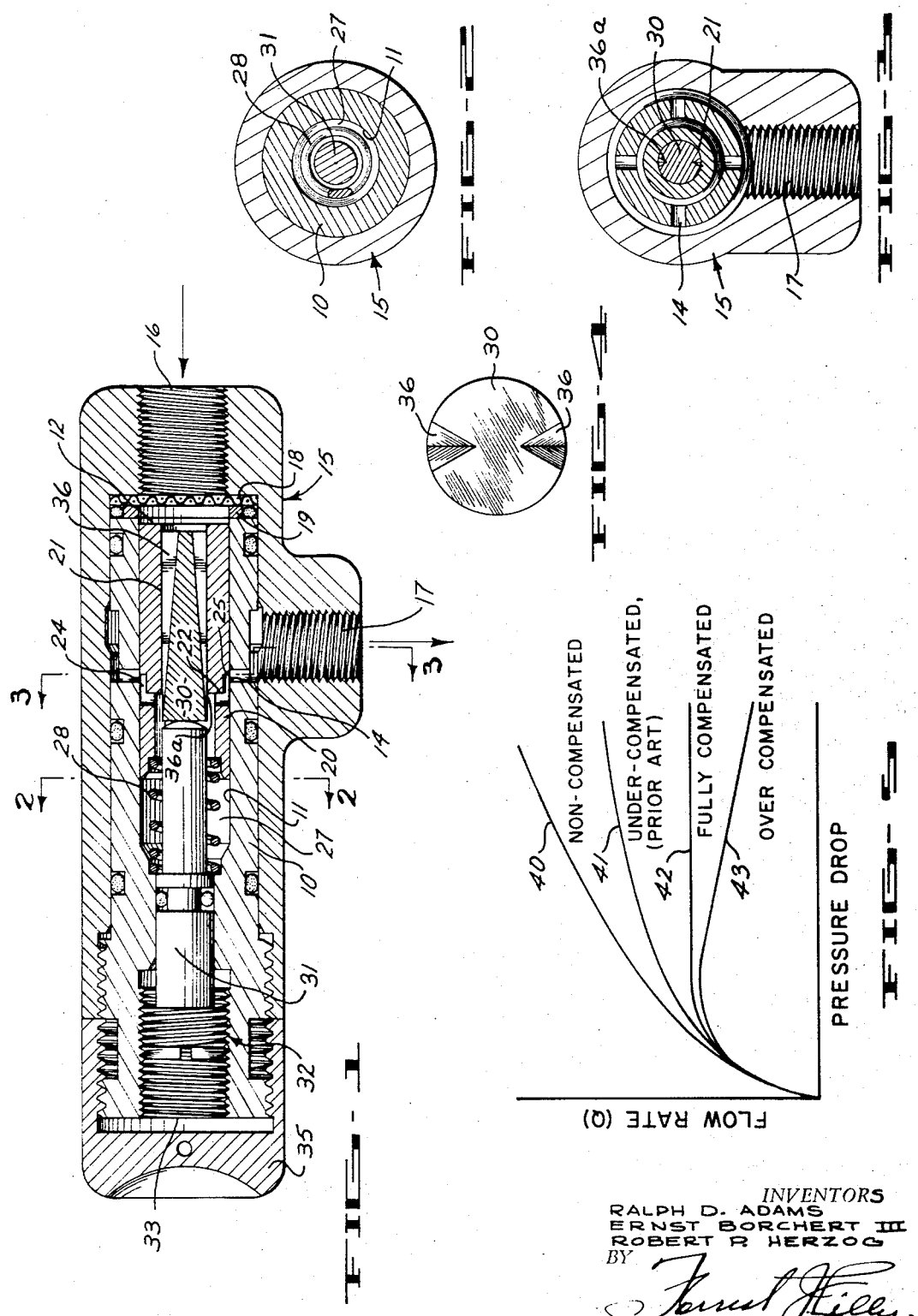

3,421,542
FLOW REGULATOR
Ralph D. Adams, Glendora, Ernst Borchert III, Montclair, and Robert P. Herzog, Azusa, Calif., assignors, by mesne assignments, to Omark-Winslow Aerospace Tool Co., Portland, Oreg., a corporation of Oregon
Filed Aug. 24, 1965, Ser. No. 482,117
U.S. Cl. 137—504     2 Claims
Int. Cl. F16k *31/12;* F16h *31/36*

ABSTRACT OF THE DISCLOSURE

A fluid flow regulator has features that produce proper compensation for changing pressures to assure a constant flow rate over the full range. It is especially designed for very low flow rates and to be self-cleaning, thereby maintaining its accuracy.

---

The present invention relates generally to flow control valves, and more especially to a compensated flow regulator wherein the rate of fluid flow through the regulator is maintained constant regardless of changes in the inlet or outlet pressures.

Generally speaking, a flow regulator comprises a variable valve to throttle or control fluid flow through the regulator, and another orifice at which there is developed a pressure drop in the fluid that does the work of moving a throttling member located at the first-mentioned valve.

Flow rate Q through an orifice varies directly as the area of the orifice and the square root of the pressure drop across the orifice, according to the formula $Q=KA\sqrt{\Delta p}$. In a basic or simple form of flow regulator, the area of the orifice at which the pressure drop is developed is maintained constant for a given flow rate. Therefore, if the flow rate is to be maintained at a constant value, the pressure drop across the orifice must also remain constant. This result has been sought by using a movable throttling member at the flow control orifice so that if the inlet pressure increases, the pressure drop increases and moves the throttling member to reduce the rate of flow through the valve. Movement of the throttling member is against a spring.

There is an inherent error in such devices because the spring force is not constant but changes with the changing spring length caused by changes in the position of the throttling member. This characteristic is inherent because some change is required in the pressure drop across the orifice in order to operate the throttling member against the force applied to it by the spring; and this error is not correctable with a valve in which the size of the orifice at which the pressure drop is created is constant. Actually the resultant control over the flow rate is more accurately described or defined as proportional control of the flow, since the flow rate is not sufficiently compensated or corrected to be truly constant at all inlet pressures.

There are many uses in industry for flow regulators; typically they are used in combination with a fluid motor. One example is in a machine tool wherein hydraulic feed mechanism is employed to control the rate of feed of a tool or of a workpiece. The objective of such hydraulic feed is to produce movement at a uniform rate independently of the resistance encountered or of the changes in inlet pressure to the flow regulator. A lack of uniformity in the feed rate, as a reflection of the deviation from a constant value of the fluid flow rate, impairs the quality of the machining operation and of the product produced.

Another objection found with known types of flow regulators of simple or basic construction is that they tend to plug, especially at very low rates of flow. Typically known types of regulators have a stationary needle valve defining an orifice of very small area and at low flow rates there is a tendency for the hydraulic fluid to deposit gum or other solids at this orifice, with the result that the net effective area of the orifice is changed. This produces a slow but constant error in the operation of the flow regulator, which may require frequent cleaning.

Thus it becomes a general object of the present invention to provide a novel design of flow regulator which is in fact a fully compensated flow regulator in that it can achieve a substantially constant rate of flow through the regulator, within design limits, or may be designed with a greater or lesser degree of compensation to achieve a desired deviation from constant flow.

It is also an object of the present invention to provide a novel design of flow regulator having an orifice of variable area at which the pressure drop in the device is created, thereby providing a compensating change in the pressure drop at the orifice to offset other factors which change the rate of flow.

It is a further object of the present invention to provide a novel type of flow regulator which has a self-cleaning action by virtue of relative movement of parts at the orifice at which the pressure drop is created, thereby maintaining these parts free from any accumulation or deposit from the hydraulic fluid.

These objects are achieved according to the present invention by providing a flow regulator having a housing with an interior pressure chamber communicating with a fluid inlet and a fluid outlet, means defining a variable area fluid orifice to create a pressure drop in the fluid stream at entry to the chamber, and valve means exerting a variable control on fluid flow at the outlet from said chamber, said valve means being exposed to inlet fluid pressure and to chamber fluid pressure and movable in response to said pressure drop to control fluid flow through the regulator.

More specifically, the valve means includes a sleeve movable axially within a bore in the housing in response to fluid pressure differential between the ends of the sleeve. The sleeve cooperates with a port in the housing to define a flow control valve of which the area is varied by movement of the sleeve. The sleeve also cooperates with a stationary member extending axially of and within the sleeve to define the orifice developing the controlling pressure drop, the area of the orifice also being variable by movement of the sleeve so that the area of the orifice creating the pressure drop varies in a predetermined manner, but at a lower rate, than the change in area of the valve controlling fluid flow.

How these objects and advantages of the present invention, as well as others not specifically mentioned herein, are attained will be more readily understood by reference to the following description and to the annexed drawing, in which:

FIG. 1 is a longitudinal median section of a fluid flow regulator embodying the present invention.

FIG. 2 is a transverse cross-section on line 2—2 of FIG. 1.

FIG. 3 is a transverse cross-section on line 3—3 of FIG. 1.

FIG. 4 is an end elevation of the core in which fluid passages of variable cross-section are located to provide the compensated orifice.

FIG. 5 is a diagram comparing qualitatively the variation in flow rates in various regulators and the present invention.

Referring now to the drawing, it will be seen that the fluid flow regulator illustrated therein comprises a body 10 having a bore 11 extending longitudinally through the body. Bore 11 provides a fluid inlet 12 at one end of the body, while the body is provided at one side with one or more radial passages forming a fluid outlet 14 spaced from inlet 12.

Body 10 may be enclosed in any suitable type of housing, the housing here indicated generally at 15 being designed to attach suitable conduits at inlet 12 and outlet 14 of the body by means of threaded openings 16 and 17, respectively. The housing is merely illustrative of the type of enclosure within which the regulator body may be located. It may equally well be located in any other type of housing, such as the body of a machine tool or the like.

At the inlet end of the body is preferably located filter screen 18 which is of a character to remove small foreign particles which might otherwise clog fluid passages or impair operation of the regulator. Downstream from filter 18 is spacer ring 19 which is preferably of annular configuration and is held between one end of body 10 and filter 18.

Located within body 10 and movable within cylindrical bore 11 extending longitudinally through the body is sleeve 20. Sleeve 20 has a longitudinally extending bore 21 which opens at both ends of the sleeve and which has a section of enlarged diameter to provide a shoulder 22 for purposes which will be further explained. The sleeve has an external annular passage 24 cut in the sleeve at a position to register with body fluid outlet 14, one end of passage 24 providing metering edge 25 which in cooperation with outlet 14 provides a fluid metering or flow control valve as will be further explained.

Sleeve 20 is shorter than the bore inside body 10 so that there is formed within body 10 an interior pressure chamber at 27 to which the inner end surfaces of sleeve 20 are exposed. Located in chamber 27 is helical spring 28 which bears at one end against a stationary shoulder on body 10 and at the other end against a shoulder on movable sleeve 20, the spring normally urging sleeve 20 toward fluid inlet 12. Travel of the sleeve in that direction is limited by engagement with the upstream end of the sleeve with spacer 19, or other travel limiting member.

Located inside sleeve 20 and movable longitudinally relative to the sleeve is core 30 which is normally held stationary with respect to the body for any given rate of fluid flow. The operative position of core 30 is adjustable axially of the body and the sleeve by means of stem 31 which is provided with an externally threaded head 32 received in an internally threaded bore 33 in body 10. By this means the stem can be moved axially of the body and sleeve to any desired position and, as shown, it provides an abutment which engages the inner or downstream end of core 30 to limit travel of the core 30 in that direction. The body is preferably provided with a protective cap 35 which covers the threaded bore 33 to protect the same and prevent any accidental change in the adjustment of the position of stem 31. Core 30 and stem 31 may be made integral with each other, but the separate construction illustrated is preferred since the core is free to move within the sleeve.

Core 30 is provided with at least one, and preferably two, external grooves 36 which, in combination with the wall of bore 21 in sleeve 20, define a pair of longitudinally extending fluid passages which extend from fluid inlet 12 at one end to pressure chamber 27 at the other end. While in cross section, passages 36 may have any desired shape, it is preferred that they have the V or triangular shape illustrated as this is a practical configuration when the flow rates are very low. As the flow rates increase, the shape and/or size of the passages may be changed, if desired, a rectangular cross section giving a somewhat larger area for fluid flow for a given diameter of core 30; and this may even be carried further by simply grinding flat surfaces on opposite sides of core 30 to give additional area for fluid flow without changing other dimensions of the regulator. From this it will be evident that the exact size and shape of passages 36 may change according to the design range of fluid flows; but in any case the passages generally taper in the direction of fluid flow so that the cross-sectional area of the passages decreases in the direction of fluid flow from inlet 12 to pressure chamber 27.

Two passages 36 are shown as this arrangement balances the radial forces on the core to eliminate any tendency of the core to bend. Obviously more passages may be used if desired.

Having described the construction of a flow regulator embodying the present invention, its operation will now be described. Fluid passages 36 terminate downstream of shoulder 22 on the sleeve when fluid is flowing, and consequently in normal operation they project forwardly of shoulder 22. In cooperation with shoulder 22 on the sleeve, the two fluid passages form what may be regarded functionally as a single orifice 36a (FIG. 3) of a size determined by the total area of passages 36 at shoulder 22 and at which is created a pressure drop from the upstream side of the orifice to the downstream side. This pressure differential ($\Delta p$) between inlet pressure $P_1$ at 12 and the pressure $P_2$ in chamber 27 forces core 30 forwardly into engagement with the end of stem 31 which holds the core stationary during normal flow conditions. The pressure drop also moves sleeve 20 to the left in FIG. 1, since the greater fluid pressure at the inlet end of the sleeve moves the sleeve until the fluid pressure $P_2$ in chamber 27 and the force exerted by spring 28 balance the upstream fluid pressure $P_1$.

Movement of sleeve 20 causes external shoulder 25 on the sleeve to move across more or less of the area of outlet port 14, edge 25 acting to meter or control the rate of fluid flow through outlet 14 and hence through the flow regulator. It is to be noted that sleeve 20 moves in the same direction to reduce the area of orifice 36a and outlet 14; that is, orifice 36a and valve means 14, 25 open or close simultaneously.

Assume a condition in which fluid is flowing through the regulator and conditions have stabilized. With a constant inlet pressure $P_1$, the rate of flow through the regulator is maintained constant. If now there is an increase in inlet pressure $P_1$, there is also an increase in the pressure $P_2$ in control chamber 27. If this latter increase is not equal to the increase in inlet pressure, there is an increase in the pressure drop across the orifice 36a at shoulder 22 upon entry into control chamber 27. This increase in the pressure drop at the orifice causes sleeve 20 to move to the left with a result that the valve means 14, 25 closes to maintain constant the rate of flow out of the regulator.

To provide a small increase in pressure drop across orifice 36a which is needed to increase the fluid pressure unbalance on the sleeve 20 that compresses the spring 28 sufficiently to close the valve means 14, 25 and thereby maintain a constant flow rate, the area of orifice 36a must decrease. This decrease in area is achieved in this construction by a shift of the sleeve 20 with respect to stationary core 30 in a direction that decreases the area of orifice 36a and thus increases the pressure drop at the orifice at the higher inlet pressure. The rate of change of the area of orifice 36a for a given axial movement of sleeve 20 is so designed as to compensate for the increase in flow which would otherwise occur for a given increase in pressure drop at the higher inlet pressure $P_1$.

An increase in flow occurs in known regulators in response to an increase in inlet pressure. Such devices have a fixed orifice at which flow is a function only of pressure drop; and the valve means controlling flow does not move properly to maintain flow substantially constant. In some devices, flow departs as much as 20–30% from a constant value. By comparison, the present device has a variable area orifice that changes area automatically in response to fluid pressure changes. Hence an increase in inlet pressure $P_1$ creates a greater increase in the pressure drop at 36a than the same pressure changes would if the orifice area were constant; and this greater increase is normally designed to hold the flow rate constant. In other words, it is made large enough to compensate for errors in previously known designs. To insure stability of operation, the force of spring 28 is designed to change at higher rate, for movement of sleeve 20, than the rate of change of pressure drop at orifice 36a.

The control exerted by operation of the device can be illustrated graphically by reference to FIG. 5. The top curve 40 illustrates the general relationship between flow rate through an orifice and the pressure drop across the orifice when the flow rate varies as the area of the orifice and the square root of the pressure drop. It is typical of prior art flow regulating devices that the flow rate is not fully compensated for by the device so that the relation between the flow rate and the pressure drop across the orifice is approximately as represented by the curve 41. Here it will be seen that the curve becomes, in part, a straight line, that is, the flow rate above some value becomes proportional to the pressure drop, but the inherent errors, mentioned above, in the devices prevent the flow rate from being maintained at a constant level.

With a fully compensated relationship, as indicated by curve 42, above a given minimum pressure drop and over the range of design values, the flow rate is held constant for any pressure drop within the design range. The present construction achieves this and it has been found that design values can be selected which will control flow in a manner to conform substantially to curve 42. In fact, the compensation can be increased to the extent that there is overcompensation so that actually the flow rate drops off for an increase in pressure, if desired, as indicated by curve 43. Thus, the relationship between the flow rate and the pressure drop is one which can be maintained constant or a deviation therefrom obtained at the will of the designer.

The sleeve 20 normally moves to the right, when fluid flow stops, because of the force exerted by spring 28. This movement, plus movement of the sleeve relative to the core during operation, assures enough motion at orifice 36a to dislodge any accumulation of foreign particles. Hence the orifice is self-cleaning.

Although not limited to any specific flow rate, the design of the present invention is particularly suited for very low rates of flow at very high unit inlet pressure $P_1$. Typical of such operations under which the device has been operated, inlet pressures $P_1$ may be in the range of 200–1000 p.s.i. with an outlet pressure $P_3$ of approximately 80 p.s.i.

Under these pressure ranges, it has been found possible to maintain constant flow through the regulator at flow rates in the range of .005 to 0.10 cubic inch per second. The result is that in a hydraulic system the hydraulic motor can be driven at a substantially uniform rate with extremely small deviation from the established rate.

Although devices of this character are especially adapted to control liquid flow, it will be understood that the present invention is not necessarily so limited.

It will be apparent to persons skilled in the art that various changes in the detailed design and arrangement of the component parts of the flow regulator constituting the present invention may be made without departing from the spirit and scope of the present invention. Accordingly, it is to be understood that the foregoing description is considered as being illustrative of, rather than limitative upon, the invention as defined by the appended claims.

We claim:
1. A fluid flow regulator comprising:
a hollow body having at one end a fluid inlet and a port in a side wall forming a fluid outlet;
a sleeve movable within the body and exposed at one end to inlet pressure and at the other end to a lower pressure within the body;
said sleeve having a shoulder cooperating with the outlet port to form a valve regulating fluid flow through the regulator;
a stationary core within and coaxial of the sleeve, the core in cooperation with the sleeve providing a fluid passage of progressively changing area that forms an orifice of variable area creating a pressure drop at fluid exit from the passage, said pressure drop moving the sleeve in a direction to simultaneously reduce fluid flow at said inlet and decrease the area of said orifice;
and means biasing the sleeve against movement in response to said pressure drop.
2. A fluid flow regulator comprising:
a hollow body having spaced fluid inlet and fluid outlet openings and an interior pressure chamber between said openings;
means defining a first variable area orifice within the body to create a first pressure drop in the fluid stream, said means including a movable member regulating the area of the orifice;
and means defining a second variable area orifice within the body to create a second pressure drop in the fluid stream, said second means including said movable member regulating the area of the second orifice;
the movable member moving in response to a change in pressure drop across said first orifice, to increase or to decrease both orifice areas simultaneously, said orifices being so shaped that their areas change at different rates to maintain constant the flow rate through the regulator;
the first orifice changing area as a linear function of movement of said movable member and the second orifice changing area as a non-linear function of movement of said movable member.

References Cited

UNITED STATES PATENTS

| | | | |
|---|---|---|---|
| 780,986 | 1/1905 | Francis | 137—504 |
| 1,159,214 | 11/1915 | Gueux | 137—503 |
| 2,367,106 | 1/1945 | Dolch | 138—46 XR |
| 2,984,261 | 5/1961 | Kates | 138—46 |

M. CARY NELSON, *Primary Examiner.*

M. O. STURM, *Assistant Examiner.*